Feb. 27, 1951 F. E. SAWYER 2,543,645
TRAP FOR ANIMALS
Filed Jan. 22, 1947 2 Sheets-Sheet 1
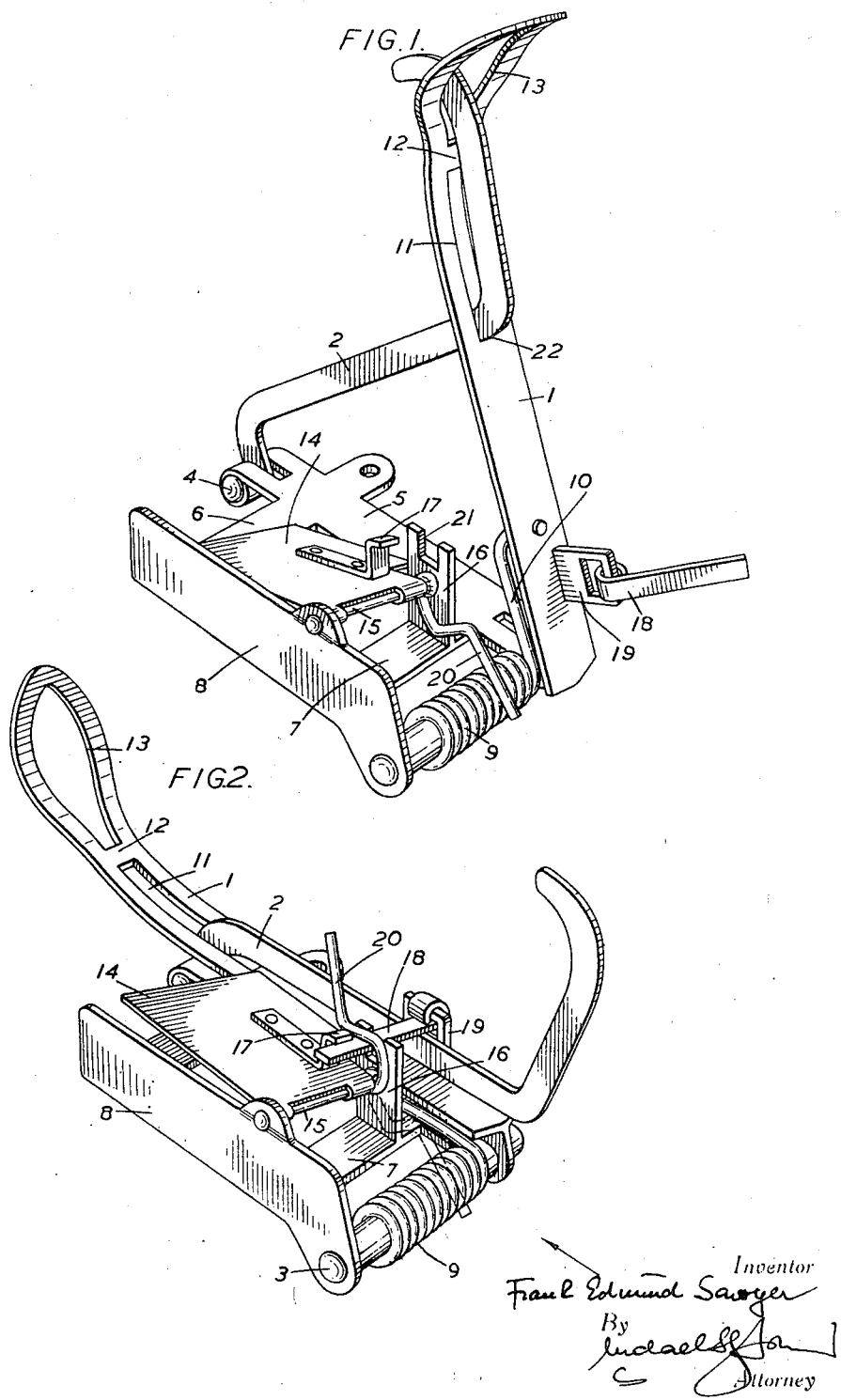

Feb. 27, 1951 F. E. SAWYER 2,543,645
TRAP FOR ANIMALS
Filed Jan. 22, 1947 2 Sheets-Sheet 2
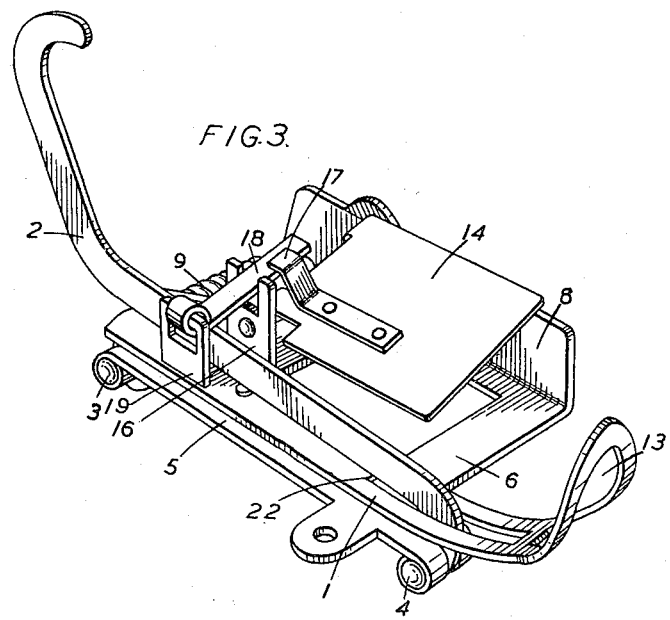
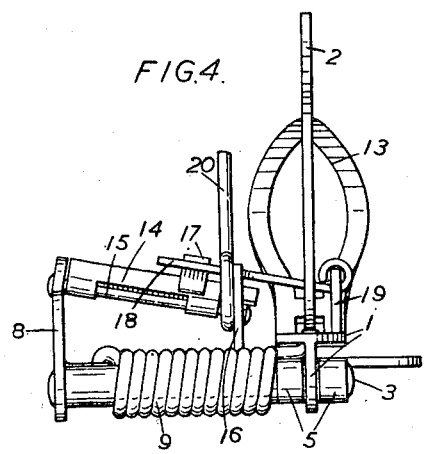
Inventor
Paul Edmund Sawyer
By
Attorney Patented Feb. 27, 1951

2,543,645

UNITED STATES PATENT OFFICE 2,543,645

TRAP FOR ANIMALS

Frank Edmund Sawyer, Salisbury, England

Application January 22, 1947, Serial No. 723,493
In Great Britain February 21, 1946

2 Claims. (Cl. 43—88)

This invention relates to rabbit or other animal traps of the kind employing a pair of pivoted trap arms which are held in a set condition by a catch or trigger device adapted to be released by the pressure of an animal on a platform, whereupon the arms close together under a powerful spring force to trap and instantly kill the animal.

An object of the present invention is to provide an improved trap of this kind which will be of simple construction capable of mass production and which will be easy to set and capable of instantly killing rabbits or like vermin caught by the trap arms.

Other objects will appear from the following specification, the novel features being particularly pointed out in the claims at the end thereof.

Reference will now be made to the accompanying drawings which illustrate by way of example one form of trap according to the present invention:

Fig. 1 is a perspective view of the trap unset.

Fig. 2 is a perspective view of the trap set but with a safety catch applied.

Fig. 3 is a view similar to Fig. 2 but with the safety catch off.

Fig. 4 is an end elevation looking in the direction of the arrow, Fig. 2.

The trap illustrated includes a pair of trap arms 1, 2 pivoted at 3, 4 respectively to the ends of a frame member 5 cross-connected by transverse members 6, 7 with a frame member 8 which is parallel to the frame member 5 and disposed at right-angles thereto. The pivot 3 is composed of a pin which is secured to the parallel frame members 5, 8 and is surrounded by a powerful torsion spring 9, one end of which is anchored to the cross frame member 7 and the other end 10 of which is engaged under the trap arm 1 near the pivoted end thereof. This arm 1, hereinafter referred to as the spring controlled arm, is formed with a longitudinal slot 11 through which the trap arm 2 extends as illustrated in Fig. 1 which shows the trap arms 1, 2 in the positions occupied when the trap is unset, a cross-piece 12 on the arm 1 acting as a stop for the arm 2. The extreme or outer end of the arm 2 is curved and extends through a slot 13 in the extremity of the arm 1.

A platform 14 is pivotally mounted on a pin 15 which is downwardly inclined towards the plane of movement of the trap arms and is secured at one end to the frame member 8 and at the other end to a pillar 16 extending upwards from the transverse frame member 7. The platform 14 carries a part 17 of a releasable catch or trigger device, the other part 18 of which comprises an arm pivoted to a slotted pillar 19 carried by the trap arm 1 near the pivoted end thereof. Before setting the trap, the arm 18 is moved to the position indicated in Fig. 1 which shows a safety hook 20 pivoted on platform pin 15.

In order to set the trap, the free ends of the arms 1, 2 are pulled apart about their pivots 3, 4, the arm 2 sliding through the slot 11. The spring controlled arm 1 is pressed down with one hand against the action of the torsion spring 9, and the arm 2 is guided with the other hand into overlying relationship to the arm 1 as illustrated in Fig. 2. At this stage of the setting operation, the operator can keep the spring controlled arm 1 down without difficulty by the pressure of one hand only, normally the left hand. The right hand is now free to render the catch or trigger device 17, 18 operative.

To render the catch device operative, the pivoted catch arm 18 is turned across the overlying trap arm 2 to rest in the bifurcated upper end 21 of the platform pillar 16. The platform is then lifted to engage the catch element 17 thereof over the pivoted catch arm 18. Before the operator releases his hold on the trap arm 2, the safety hook 20 is slipped over the catch arm 18 as illustrated in Fig. 2. The trap is now set and may be concealed in the ground at the desired position with the platform 14 located horizontally. The only parts that should be visible above the ground are the free ends of the arms 1, 2 and the hook 20. Upon removal of the safety hook 20, the trap is ready for use, as illustrated in Fig. 3.

When a rabbit or other animal steps on the platform 14, the latter is depressed, thereby releasing the catch device 17, 18. The trap arm 1 is then rapidly swung upwardly under the action of the torsion spring 9. The inner end 22 of the slot 11 serves as a driving connection between the arms 1, 2 so that during the upward movement of the trap arm 1 it drives the arm 2, whereby both arms simultaneously close together to entrap the animal between the free ends thereof.

By reason of the pivotal axis of the platform being downwardly inclined towards the plane of movement of the trap arms, the free ends of the arms will close approximately above the middle of the platform. The trap should be concealed in the ground with the platform 14 horizontal so that the free ends of the arms in closing approximately above the middle of the platform will operate to catch and instantly kill a rabbit whether its steps on the platform from one side or the other.

The trap according to the invention may be made in varying sizes depending on the kind of animal to be trapped, steel being preferably used for its construction.

I claim:

1. An animal trap comprising a base, a pair of trap arms pivoted to spaced points on the base so as to be movable to a set position in which each arm extends towards and beyond the pivot of the other arm, a driving spring connected to only one of the arms and tending to swing it upwards, a trip platform, a pivot therefor downwardly inclined towards the plane of movement of the trap arms and carried by the base, a releasable catch device by means of which the arms may be held down in the set position, a part of said catch device being carried by said trip platform, and a coupling between the arms such that, upon tripping of the catch device by the pressure of an animal on the platform, the spring controlled arm flies upwards and lifts the other arm by a direct upward thrust, whereby the arms cross each other and catch the animal between their converging outer ends.

2. An animal trap comprising a base, a pair of trap arms pivoted at spaced points on the base, one arm being provided with a longitudinal slot through which the other arm can pass to permit each arm to extend towards and beyond the pivot of the other arm to a set position, a driving spring connected to the slotted arm and tending to swing it upwards, a trip platform, a pivot therefor downwardly inclined towards the plane of movement of the trap arms and carried by the base, and a releasable catch device carried partly by the platform and by means of which the arms may be held down in the set position in which the slotted spring controlled arm is disposed below the other arm, the inner end of the slot serving as a driving connection between the arms such that upon tripping of the catch device by pressure of an animal on the platform, the spring controlled slotted arm flies upwards and through said driving connection lifts the other arm by a direct upward thrust, whereby the arms cross each other and catch the animal between their converging outer ends.

FRANK EDMUND SAWYER.

REFERENCES CITED

The following references are of record in the file of this patent:

UNITED STATES PATENTS

| Number | Name | Date |
|---|---|---|
| 440,336 | Shaw | Nov. 11, 1890 |
| 905,390 | Truble | Dec. 1, 1908 |
| 1,470,453 | LaValley | Oct. 9, 1923 |

FOREIGN PATENTS

| Number | Country | Date |
|---|---|---|
| 117,785 | Australia | Nov. 16, 1943 |
| 473,718 | Great Britain | Oct. 19, 1937 |